(12) United States Patent
Zielenbach et al.

(10) Patent No.: US 11,448,239 B2
(45) Date of Patent: Sep. 20, 2022

(54) CONTROL OF HYDRAULIC ACTUATING CYLINDERS IN ROLL STANDS

(71) Applicant: SMS group GmbH, Düsseldorf (DE)

(72) Inventors: Michael Zielenbach, Siegen (DE); Jörn Sohler, Kreuztal (DE); Peter Horn, Hilchenbach (DE); Martin Schmidt, Hilchenbach (DE)

(73) Assignee: SMS group GmbH, Düsseldorf (DE)

( * ) Notice: Subject to any disclaimer, the term of this patent is extended or adjusted under 35 U.S.C. 154(b) by 0 days.

(21) Appl. No.: 17/425,315

(22) PCT Filed: Jan. 23, 2020

(86) PCT No.: PCT/EP2020/051692
§ 371 (c)(1),
(2) Date: Jul. 22, 2021

(87) PCT Pub. No.: WO2020/156932
PCT Pub. Date: Aug. 6, 2020

(65) Prior Publication Data
US 2022/0082115 A1    Mar. 17, 2022

(30) Foreign Application Priority Data
Jan. 28, 2019    (DE) .................... 10 2019 201 043.1

(51) Int. Cl.
*B21B 35/00*    (2006.01)
*F15B 21/08*    (2006.01)
(Continued)

(52) U.S. Cl.
CPC .............. *F15B 11/10* (2013.01); *B21B 35/00* (2013.01); *F15B 21/08* (2013.01); *G05B 19/042* (2013.01); *G05B 2219/25312* (2013.01)

(58) Field of Classification Search
CPC .. F15B 11/10; F15B 21/08; F15B 2211/3144; F15B 2211/3057; F15B 2211/6336; B21B 31/02; B21B 35/00
See application file for complete search history.

(56) References Cited

U.S. PATENT DOCUMENTS 6,443,046 B1    9/2002    Deininger et al.
2004/0182231 A1*    9/2004    Yo .......................... F15B 11/022
                                                                91/361

(Continued)

FOREIGN PATENT DOCUMENTS

DE    10154056 A1    8/2002
DE    102011120767 A1    6/2013

(Continued)

*Primary Examiner* — Thomas E Lazo
*Assistant Examiner* — Daniel S Collins
(74) *Attorney, Agent, or Firm* — Smartpat PLC

(57) ABSTRACT

A hydraulic control loop controls a hydraulic adjusting cylinder. The cylinder has a cylindrical housing and a displaceable piston therein. The piston divides the housing interior into a first and a second hydraulic chamber. A first hydraulic valve supplies the first hydraulic chamber with hydraulic fluid. A hydraulic pressure of the first hydraulic chamber is adjustable by controlling the first hydraulic valve. A second hydraulic valve supplies the second hydraulic chamber with hydraulic fluid. A hydraulic pressure of the second hydraulic chamber is adjustable by controlling the second hydraulic valve. A control device controls the two hydraulic valves. In a position control state, the second hydraulic valve is controlled by a position control signal dependent on the working position of the piston and the first hydraulic valve is controlled by an adjusted position control signal, that is generated on the basis of the position control signal.

14 Claims, 2 Drawing Sheets

(51) Int. Cl.
    *F15B 11/10*        (2006.01)
    *G05B 19/042*       (2006.01)

(56)           References Cited

U.S. PATENT DOCUMENTS

2011/0120296 A1    5/2011   Hoshino et al.
2013/0145926 A1    6/2013   Koeckemann et al.
2019/0176969 A1    6/2019   Zierten et al.

FOREIGN PATENT DOCUMENTS

DE     102013206973 A1    10/2014
DE     102014220743 A1     4/2016
EP          1033498 B1    10/2004
EP          3495261 A1     6/2019
WO       2013089226 A1     6/2013

* cited by examiner

CONTROL OF HYDRAULIC ACTUATING CYLINDERS IN ROLL STANDS

CROSS-REFERENCE TO RELATED APPLICATION

This application is a national stage application, filed under 35 U.S.C. § 371, of International Patent Application No. PCT/EP2020/051692, filed on 2020 Jan. 23, which claims the benefit of German Patent Application No. 10 2019 201 043.1, filed 2019 Jan. 28.

TECHNICAL FIELD

The disclosure relates to a hydraulic control loop and a method for controlling a hydraulic actuating cylinder, in particular an adjusting cylinder for a working roll in a roll stand, preferably an edging stand.

BACKGROUND

Adjusting the roll gap between two working rolls by means of hydraulic actuating cylinders is known. For this purpose, the end-side bearings of one or more working rolls are held by the actuating cylinders so that they can be displaced. In particular in the case of edging stands, the actuating cylinders can have a comparatively long stroke. The actuating cylinders can be operated via a so-called "2-edge control" or "4-edge control."

In the case of 2-edge control, the inflow of hydraulic fluid into the piston-side cylinder chamber and the outflow from it are effected by one or more continuously variable valves, while the rod-side cylinder chamber is kept at a constant pressure. Thereby, the continuously variable valve serves as an actuator for the position or pressure control of the actuating cylinder. Only one outlet of the continuously variable valve is connected to the actuating cylinder. The other outlet of the continuously variable valve is not used. A continuously variable valve can also be used in conjunction with a pressure controller to set the constant pressure in the rod-side cylinder chamber. The rod-side piston surface subjected to the constant pressure is usually kept small (for example, approximately 15% of the opposite piston surface), since the force resulting from such surface and the constant pressure counteracts the piston-side force.

In the case of 4-edge control, one outlet of a continuously variable valve is connected to the chamber on one cylinder side of the actuating cylinder, and another outlet of the continuously variable valve is connected to the chamber on the other cylinder side. Such type of control is particularly applicable for actuating cylinders with two piston surfaces of the same size, such as adjusting cylinders of edging devices with two piston rods of identical diameters.

A critical operating state of actuating cylinders occurs with sudden changes in load, for example, changes in rolling force immediately upon tapping. This compresses the adjusting cylinder, which can lead to thickness defects on the rolled material. The problem increases due to the compressibility of the hydraulic fluid as the hydraulic fluid column increases on that cylinder side that is compressed by the tapping. An impact side load thus causes the actuating cylinder to sag for a short period of time. In the case of 2-edge control, the rod-side piston surface does not have a large effect on compression, since it is small compared to the opposite piston side and the pressure on it is constant. With 4-edge control, both sides of the piston act against the tapping. As a result, the increasing sagging of one side with increasing hydraulic fluid column can be at least partially compensated by the decreasing sagging of the other side. A disadvantage of such hydraulic circuit, however, is that the cylinder force required to set the target position results from two variable pressures and the associated piston surfaces. As such, to set a specific force, there are theoretically an infinite number of combinations for the two cylinder pressures. The pressure combination that is ultimately set depends, among other things, on the leakage of the valves, and thus can barely be defined. For this reason, it can happen that the rod-side pressure of the piston surface drops to 0 bar, which means that the counteraction or spring effect on the tapping on the rod side disappears. This in turn can lead to problematic negative pressures and cavitation phenomena.

EP 1 033 498 B1 deals with the above-mentioned problem of an unwanted displacement of the piston in the event of an impact-like, external load on the piston. Therein, locking the piston prior to such a load under a hydraulic pressure, which is dependent on the current working position of the piston, is proposed. In doing so, the hydraulic pressure must be selected such that it decreases from the stop position of the piston on the side relieved of the external force to the opposite stop position over the travel distance.

After the hydraulic pressure is selected and set in this manner, the position of the piston is assumed to be sufficiently stable. After hydraulic locking, there is no further pressure or position control of the actuating cylinder. As a result, changes in the behavior of the control loop, for example the influence of any valve wear on the stability of the control loop under load, are not taken into account.

WO 2013/089226 A1 and US 2011/0120296 A1 disclose a hydraulic actuator and a method for controlling such an actuator.

SUMMARY

One object of the invention is to specify an improved hydraulic control loop along with an improved method for controlling a hydraulic actuating cylinder, in particular an adjusting cylinder for a working roll in a roll stand, in particular to improve the stability of the piston of the actuating cylinder in the event of a sudden change in load and/or the reliability of the control.

The object is solved with a control loop as described herein and a method as described herein. Advantageous embodiments as disclosed in the following description of the invention and the description of preferred exemplary embodiments.

The hydraulic control loop is used to control a hydraulic actuating cylinder, in particular an adjusting cylinder for a working roll in a roll stand. It particularly preferably is an adjusting cylinder in an edging stand, since these have to realize comparatively large strokes and the technical problem of stabilizing the piston against external forces becomes more relevant as the length of the actuating cylinder increases.

As usual, the actuating cylinder has a cylindrical housing and a piston displaceably arranged therein, which divides the housing interior into a first hydraulic chamber and a second hydraulic chamber. It should be noted that the terms "first" and "second" herein do not imply any order or sequence, but merely serve to make a linguistic distinction. In the case of an actuating cylinder with a piston rod arranged on one side, the first hydraulic chamber is assigned to the rod-side hydraulic chamber and the second hydraulic chamber is assigned to the piston-side hydraulic chamber.

The control loop comprises at least one first hydraulic valve, which is configured to supply the first hydraulic chamber of the actuating cylinder with a hydraulic fluid, wherein the hydraulic pressure of the first hydraulic chamber is adjustable, i.e. variable, via a control of the first hydraulic valve. The control loop further comprises at least one second hydraulic valve, which is configured to supply the second hydraulic chamber of the actuating cylinder with a hydraulic fluid, wherein the hydraulic pressure of the second hydraulic chamber is adjustable, i.e. likewise variable, via a control of the second hydraulic valve. The two or more hydraulic valves for actuating the actuating cylinder can each be implemented by a multi-way valve. Preferably, one or more of the hydraulic valves are designed as continuously variable valves, for example proportional valves.

The control loop further comprises a control device provided for controlling the two hydraulic valves. The control device is configured, in a position control state, to control the second hydraulic valve with a position control signal dependent on the working position of the piston, and to control the first hydraulic valve with an adjusted position control signal, which is a signal generated on the basis of the position control signal. In other words, the control device can adopt a mode of operation referred to as a "position control mode," in which the second hydraulic chamber is supplied with a hydraulic pressure dependent on the working position of the piston, by controlling the second hydraulic valve with a position control signal, and the first hydraulic chamber is supplied with a hydraulic pressure also dependent on the working position of the piston, by controlling the first hydraulic valve with another signal, which is referred to herein as an "adjusted position control signal." The adjusted position control signal is generated by the control device on the basis of the position control signal, i.e. dependent on the position control signal. For example, the adjusted position control signal can be a function of the position control signal.

By adjusting the hydraulic pressures in the first and second hydraulic chambers based on the position control signal, which is dependent on the working position of the piston, a complete pressure drop can be prevented. The spring effects of the hydraulic chambers on both sides of the piston can be used in a targeted manner for stabilization. In this manner, a stable and reliable hydraulic locking of the piston at the current working position can be realized. Since the piston hardly sags at all in the event of a sudden change in load, the actuating cylinder can be operated with a comparatively long hydraulic fluid column, i.e. it can have a long stroke, without any disadvantages in terms of rolling stability and the quality of the rolled material. By controlling the hydraulic pressures in the first and second hydraulic chambers based on the position control signal, it is also possible to prevent the pressure in one of the two hydraulic chambers, such as the rod-side hydraulic chamber, from falling below a threshold value, i.e., below a certain minimum pressure, during rolling, thereby reducing the risk of cavitation during the rolling process.

Preferably, the control device is configured to perform the control of the two hydraulic valves in case of a sudden load or load change of the piston in the position control state. Such a change in load or force occurs, for example, when the roll stand is tapped. The position control state is particularly suitable for such a case, since reliable stabilization or the hydraulic locking of the piston leads to an improvement in rolling quality.

Preferably, the control device comprises a position controller, which is configured to generate the position control signal, along with an adjustment device having an input that receives the position control signal and an output that outputs the adjusted position control signal. Thereby, the adjustment device takes over the generation of the adjusted position control signal. In this manner, the adjusted position control signal can be generated in a structurally simple and flexibly adjustable manner. In accordance with a particularly preferred embodiment, the adjusted position control signal is generated by inverting the position control signal, thereby generating an optimal and mutually adjusted spring action of the two hydraulic chambers.

Preferably, the control device has a wear adjustment device, which is configured to evaluate the position control signal with an additional factor. Such an additional factor can be used to compensate for the wear of the first and/or second hydraulic valve. For example, the output of a leakage fluid integrator that monitors or detects a leakage of hydraulic fluid can be used as a measure of wear. In this manner, the position control signal can be continuously adjusted to the wear in the control loop, such as valve wear, which means that a decrease in control stability with increasing wear can be prevented.

Preferably, the control device has a switching device that is configured to switch between the position control state and a pressure control state. The "pressure control state" here refers to an operating state of the control loop for positioning the piston, i.e. for changing the working position of the piston. In accordance with this particularly preferred embodiment, the control device is configured to control the first hydraulic valve in the pressure control state, such that the hydraulic pressure in the first hydraulic chamber (during the positioning of the piston) remains essentially constant, while the second hydraulic valve, controlled by the position control signal, functions as an actuator. In this manner, the position of the piston, and thus the position of any associated working roll, can be changed in a technically simple and reliable manner.

The piston has a first cylinder surface and a second cylinder surface, wherein the nominal flow rate of the first hydraulic valve in accordance with a preferred embodiment is lower than the nominal flow rate of the second hydraulic valve by the surface ratio of the first cylinder surface to the second cylinder surface, thereby ensuring a particularly harmonious actuation of the actuating cylinder. Thereby, the first cylinder surface is preferably on the rod side of the piston, while there is no piston rod on the opposite side of the piston.

The above object is further solved by a method for controlling a hydraulic actuating cylinder, in particular an adjusting cylinder for a working roll in a roll stand, which has a cylindrical housing and a piston displaceably arranged therein, which divides the housing interior into a first hydraulic chamber and a second hydraulic chamber. The method comprises the following: Supplying a hydraulic pressure to the first hydraulic chamber by a first hydraulic valve; supplying a hydraulic pressure to the second hydraulic chamber by a second hydraulic valve; wherein, in a position control state, the second hydraulic chamber is supplied with a hydraulic pressure dependent on the working position of the piston, by controlling the second hydraulic valve with a position control signal, and the first hydraulic chamber is supplied with a hydraulic pressure dependent on the working position of the piston, by controlling the first hydraulic valve with an adjusted position control signal, which is a signal generated on the basis of the position control signal.

The features, technical effects, advantages along with exemplary embodiments described with regard to the hydraulic control loop apply analogously to the method.

Thus, in the event of a sudden load or change in load on the piston, for example when the roll stand is tapped, the two hydraulic valves are controlled in the position control state, since it is precisely in such a case that reliable stabilization or the hydraulic locking of the piston leads to an improvement in rolling quality.

Preferably, the adjusted position control signal is generated by inverting the position control signal, thereby generating an optimal and mutually adjusted spring action of the two hydraulic chambers.

Preferably, the position control signal is evaluated with an additional factor, which is provided, for example, to compensate for the wear of the first and/or second hydraulic valve. For example, the output of a leakage fluid integrator that monitors or detects a leakage of hydraulic fluid can be used as a measure of wear. In this manner, the position control signal can be continuously adjusted to the wear in the control loop, such as valve wear, which means that a decrease in control stability with increasing wear can be prevented.

Preferably, the method further comprises the following: Positioning the piston in a pressure control state in which the first hydraulic valve is controlled such that the hydraulic pressure in the first hydraulic chamber remains essentially constant, and the second hydraulic valve is controlled by the position control signal; and switching from the pressure control state to the position control state. In this manner, the position of the piston, and thus the position of any associated working roll, can be changed in a technically simple and reliable manner.

Preferably, the hydraulic pressure in the first and/or second hydraulic chamber in the pressure control state is set essentially to the system pressure before switching to the position control state. If the associated hydraulic valve draws the high pressure from a pressure accumulator, this can be regarded as the system pressure herein. In this manner, after switching to the position control state, the spring action of the relevant hydraulic chamber(s), preferably on the rod side, can be utilized to the maximum.

Preferably, in the position control state, the hydraulic pressure in the first and/or second hydraulic chamber, which is dependent on the position of the piston, is set in such a manner that it decreases from the stop position of the piston on the side of the piston that is relieved when a change in load occurs on the piston to the opposite stop position over the travel distance. In this manner, the hydraulic locking of the piston at the point in time of the load change can be optimized.

Further advantages and features of the present invention are apparent from the following description of preferred exemplary embodiments. The features described therein may be implemented alone or in combination with one or more of the features set forth above, provided the features do not contradict each other. The following description of preferred exemplary embodiments is made with reference to the accompanying drawings.

DETAILED DESCRIPTION

Preferred exemplary embodiments are described below with reference to the figures. In doing so, identical, similar or similarly acting elements are provided with identical reference signs in the various figures, and a repeated description of such elements is partially omitted, in order to avoid redundancies.

Figure 1A:
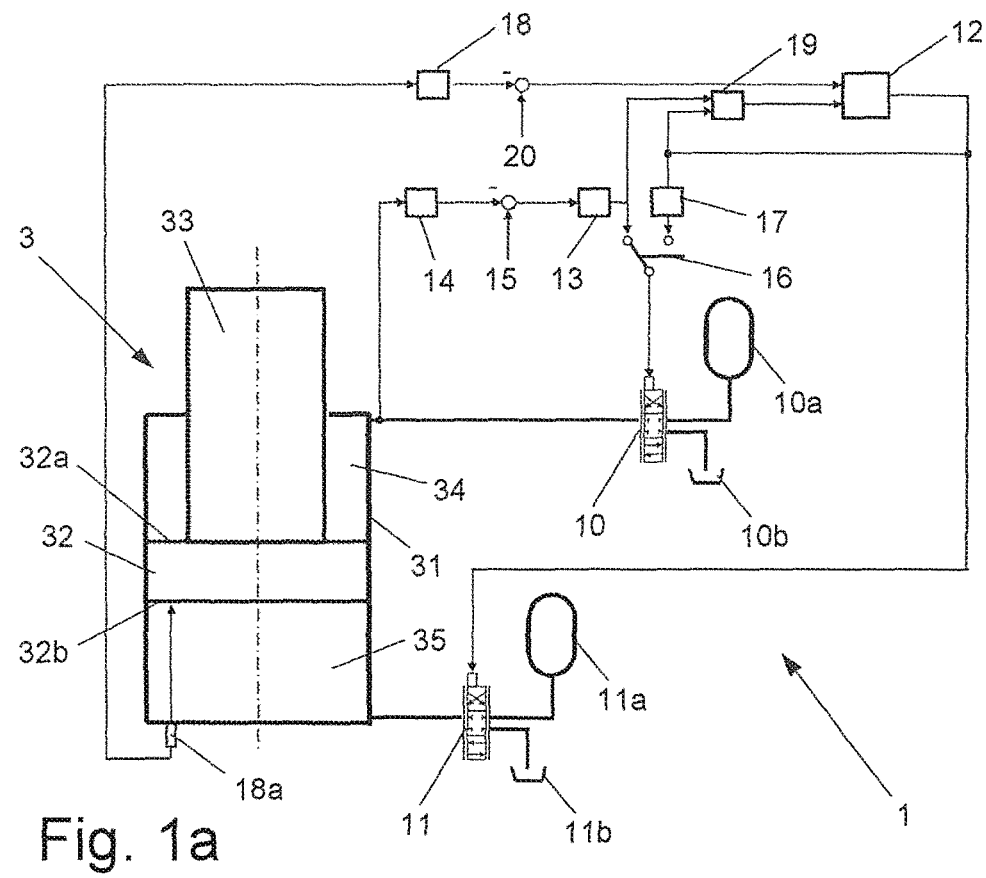
FIG. 1a and FIG. 1b are schematic representations of a hydraulic control loop for controlling an actuating cylinder, which is provided for use in a rolling mill, shown in a pressure control state (FIG. 1a) and a position control state (FIG. 1b).
Figure 1B:
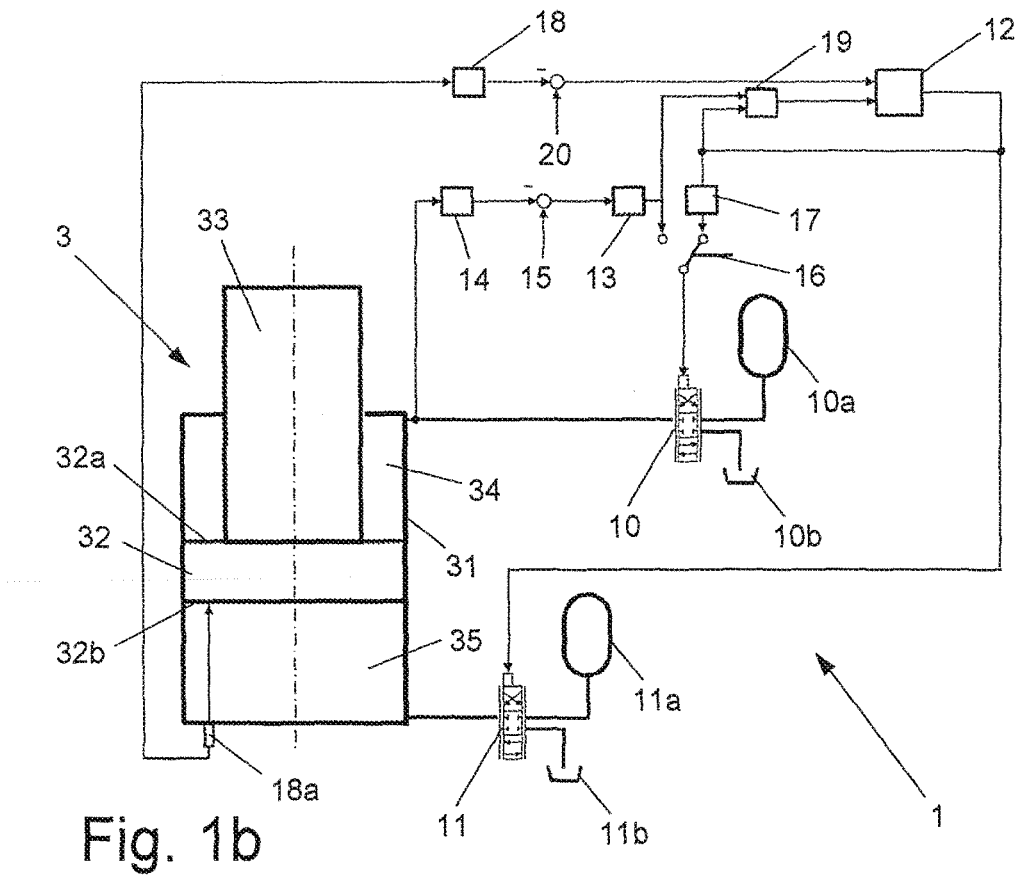

FIGS. 1a and 1b are schematic representations of a hydraulic control loop 1 for controlling an actuating cylinder 3, which is provided for use in a rolling mill, shown in a pressure control state (FIG. 1a) and a position control state (FIG. 1b).

The actuating cylinder 3, which is preferably an adjusting cylinder for an edging stand, has a cylindrical housing 31 in which a piston 32 is displaceably mounted. In the present exemplary embodiment, the actuating cylinder 3 has a piston rod 33 on one side of the piston 32, such that the piston 32 divides the housing interior into a first, i.e. rod-side, hydraulic chamber 34 and a second, i.e. piston-side, hydraulic chamber 35. The two hydraulic chambers 34, 35 contain a hydraulic fluid, preferably hydraulic oil. The pressures in the hydraulic chambers 34, 35 act accordingly on a first, i.e. rod-side, cylinder surface 32a and a second, i.e. piston-side, cylinder surface 32b.

It should be noted that the actuating cylinder structure shown in FIGS. 1a and 1b is only exemplary. For example, the control described herein is also applicable to an actuating cylinder with two piston rods, thus two annular cylinder surfaces.

The control loop 1 has a first hydraulic valve 10, which is configured for the inflow of hydraulic fluid into the first hydraulic chamber 34 and the outflow of hydraulic fluid therefrom. For this purpose, an outlet of the first hydraulic valve 10 is connected to the first hydraulic chamber 34 via a hydraulic line. Any other outputs of the first hydraulic valve 10 are not used. The first hydraulic valve 10 is preferably formed as a continuously variable valve, for example a proportional valve.

Similarly, the control loop 1 has a second hydraulic valve 11, which is configured for the inflow of the hydraulic fluid into the second hydraulic chamber 35 and the outflow of the hydraulic fluid therefrom. For this purpose, an outlet of the second hydraulic valve 11 is connected to the second hydraulic chamber 35 via a hydraulic line. Any further outputs of the second hydraulic valve 11 are not used. The second hydraulic valve 11 is preferably formed as a continuously variable valve, for example a proportional valve.

It should be noted that several hydraulic valves can be provided on the piston side and/or on the rod side.

Accordingly, the inputs of the first and second hydraulic valves 10, 11 are each connected to a pressure accumulator 10a, 11a and a hydraulic fluid reservoir 10b, 11b via hydraulic lines. Even though the pressure accumulators 10a and 11a are shown as separate accumulators in FIG. 1, they are preferably implemented by a single pressure accumulator. The same applies to the hydraulic fluid reservoirs 10b, 11b. The pressure accumulators 10a, 11a can be charged from the hydraulic fluid reservoirs 10b, 11b by a pump (not shown). Depending on the position of the hydraulic valves 10, 11, the first and second hydraulic chambers 34, 35 of the actuating cylinder 3 can be supplied with a pressurized hydraulic fluid and the piston 32 can thus be pressurized on both sides in a targeted manner.

The position of the piston 32 (thus the roll position) is set by a position controller 12, which uses the second, i.e. piston-side, hydraulic valve 11 as an actuator. The control signal output from the position controller 12 is referred to as the "position control signal."

The position controller 12 receives as the input a signal from a displacement gauge 18, which uses a displacement sensor 18a to determine the current position or location of the piston 32 via a displacement measurement, allowing the control to be performed as a function of the working position of the piston 32. Preferably, the target position can be adjusted or selected via a target position input 20, for example via a user input or a signal that is the result of an automated calculation or optimization of the system. In doing so, the hydraulic pressure in the first and/or second hydraulic chamber 34, 35 can be selected in such a manner that it decreases from the stop position of the piston on the piston side relieved by the external force to the opposite stop position over the travel distance.

The position controller 12 can receive a further input that evaluates the position control signal with an additional factor, which is preferably used to compensate for wear of the first and/or second hydraulic valves 10, 11. Via this second input of the position controller 12, a position control amplification thus preferably takes place, which adds a wear-related or wear-compensating amplification to the normal position control. This can be determined by a wear adjustment device 19. The output of a leakage fluid integrator in the position control is preferably used as a measure of wear. In this manner, the position control signal can be continuously adjusted to the valve wear, thus preventing a decrease in control stability with increasing valve wear.

A constant pressure is adjusted on the rod side of the actuating cylinder 3 outside the actual rolling process for positioning the piston 32. The outlet of the position controller 12 is connected to the control input of the second hydraulic valve 11 via a control path. The constant pressure on the rod side is achieved by connecting the control input of the first hydraulic valve 10 to the outlet of a pressure controller 13, as shown in FIG. 1a. The pressure controller 13 receives as the input a measured value of the current pressure on the rod side of the actuating cylinder 3, which is determined by a pressure gauge 14. Preferably, the target pressure is adjustable or selectable via a target pressure input 15, for example via a user input or a signal that is the result of an automated calculation or optimization of the system.

The state of the control loop 1 for adjusting the position of the piston 32, which is also referred to herein as the "pressure control state," is shown in FIGS. 1a and 1s adjusted by the corresponding of a switching device 16.

In the event of a sudden change in load, for example during tapping, the pressure control on the piston rod side is switched off by switching the switching device 16, and both the first and second hydraulic valves 10, 11 are then controlled by the position controller 12. Such state, also referred to herein as the "position control state," is shown in FIG. 1b.

In this case, the outlet of the position controller 12 is connected to the second hydraulic valve 11, as in the pressure control state, and further to the first hydraulic valve 10 via an adjustment device 17. In other words, the position control signal is supplied in unmodified form to the second hydraulic valve 11, while it is supplied modified by the adjustment device 17 to the first hydraulic valve 10. The adjustment device 17 adjusts the control signal defined and output by the position controller 12 for the piston side of the actuating cylinder 3 to the rod side. Such rod-side adjusted valve control signal is referred to as the "adjusted position control signal."

The adjustment preferably takes place in such a manner that the first hydraulic valve 10, i.e. the pressure adjustment on the rod side of the actuating cylinder 3, receives the inverted signal output from the position controller 12 to the second hydraulic valve 11.

The described control of the two hydraulic valves 10, 11 prevents a complete pressure drop in the event of a sudden change in load on the piston 32 after the switching to the position control state, which reliably utilizes the spring action of both hydraulic chambers 34, 35. In this manner, a stable and reliable locking of the piston 32 can be realized. In doing so, the pressure in the first hydraulic chamber 34 is preferably adjusted close to the possible system pressure before the sudden change in load in the pressure control state, in order to produce the best possible hydraulic lock.

The pressure in the rod-side hydraulic chamber 34 can drop during rolling. The corresponding control of the first hydraulic valve 10 by means of the position controller 12 can ensure that the pressure does not fall below a desired minimum value. This reduces the risk of cavitation during the rolling process.

Since the piston 32 hardly sags at all in the event of a sudden change in load, the actuating cylinder 3 can be operated with longer hydraulic fluid columns, i.e. longer strokes, without any disadvantages in terms of rolling stability and the quality of the rolled material. Thus, the actuating cylinder 3 can be enlarged overall by increasing the rod-side cylinder surface 32a relative to the piston-side cylinder surface 32b. For example, an actuating cylinder 3 with a diameter ratio of the piston-side cylinder surface 32b to the rod-side cylinder surface 32a of 1050 mm/970 mm with a surface ratio of approximately 1.17 becomes an actuating cylinder 3 with a diameter ratio of 1100 mm/800 mm with a surface ratio of approximately 2.0. The nominal flow of the hydraulic valve 10 on the rod side is preferably lower than the nominal flow of the hydraulic valve 11 on the piston side by the surface ratio.

It should be noted that the electrical/electronic control and/or regulating devices (position controller 12, pressure controller 14, switching device 16, adjustment device 17, etc.) shown as separate modules to illustrate the mode of operation may be integrated or divided among several devices that communicate with each other. In addition, these do not have to be physically located at the site of the actuating cylinder 3 or the rolling mill, but can be realized, for example, by one or more computing devices embedded in a network such as the Internet.

The position controller 12, pressure controller 13, pressure gauge 14, target pressure input 15, switching device 16, adjustment device 17, displacement gauge 18, wear adjustment device 19, and target position input 20 together form an exemplary control device. However, not all of these modules are necessarily required to implement the control device.

The exchange of control and measurement signals can take place on a wireless or wired basis, which is why the terms "connected," "control path," etc., mean a communicative link, but do not require a physical connection, such as a cable.

FIGS. 2a to 2d are diagrams that show the chronological course of selected parameters of the control loop 1 in accordance with FIGS. 1a and 1b when a sudden change in load on the piston 32 occurs.

Figure 2A:
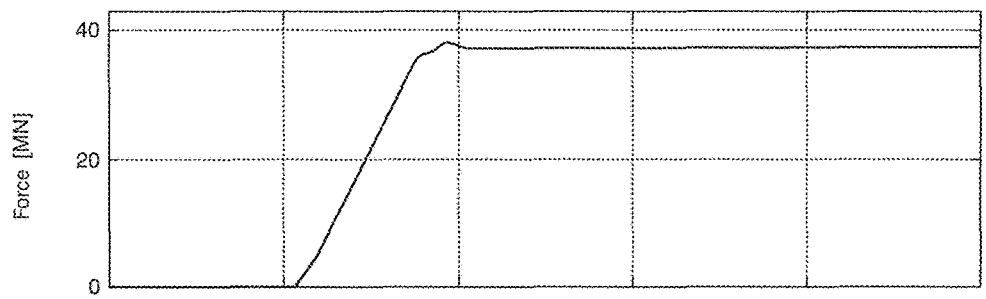
FIGS. 2a to 2d are diagrams that show the chronological course of selected parameters of the control loop in accordance with FIGS. 1a and 1b when a sudden change in rolling force occurs.
Figure 2B:
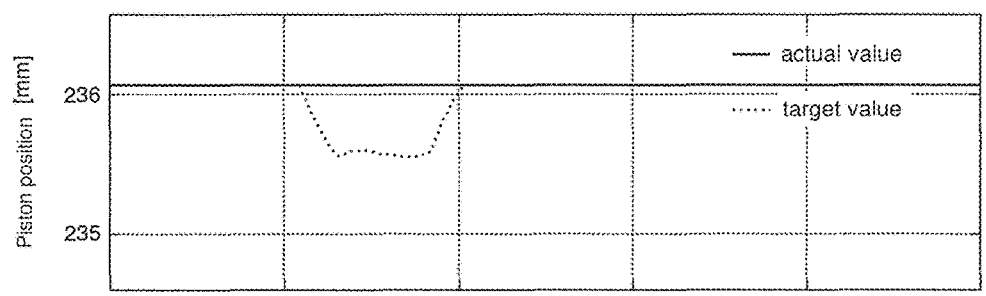
Figure 2C:
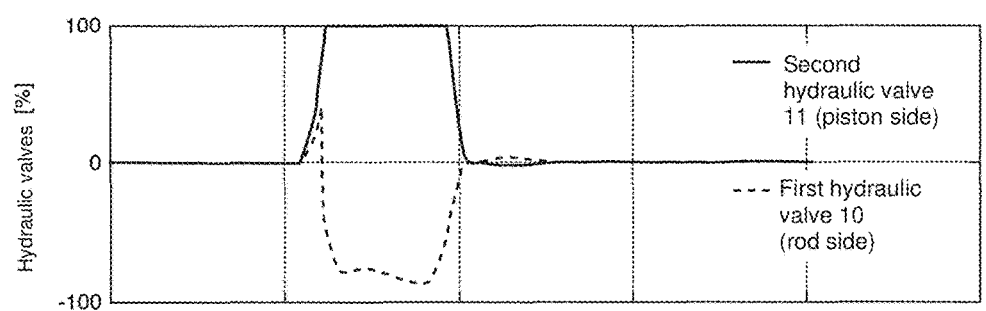
Figure 2D:
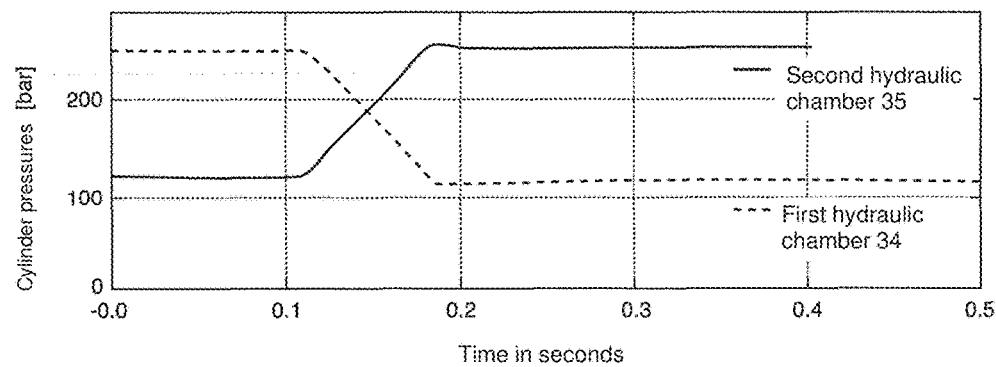

For example, FIG. 2a shows an external force acting on piston 32 as a function of time. The control loop 1 is located in the position control state. At a point in time approximately at 0.1 seconds, the load on the piston 32 changes, for example due to a tapping. The actual piston position then deviates only very slightly from the target value, in accordance with FIG. 2b, and quickly returns to the target position. The compensation is realized by controlling the two hydraulic valves 10 and 11, which can be seen in FIG. 2c. The second hydraulic valve 11 is controlled with the position control signal, while the first hydraulic valve 10 is controlled with the signal inverted to it, the adjusted position control signal. FIG. 2d shows the hydraulic pressures in the associated hydraulic chambers 34, 35.

To the extent applicable, any of the individual features set forth in the exemplary embodiments may be combined and/or interchanged.

LIST OF REFERENCE SIGNS

1 Hydraulic control loop
10 First hydraulic valve
10a Pressure accumulator of the first hydraulic valve
10b Hydraulic fluid reservoir of the first hydraulic valve
11 Second hydraulic valve
11a Pressure accumulator of the second hydraulic valve
11b Hydraulic fluid reservoir of the second hydraulic valve
12 Position controller
13 Pressure controller
14 Pressure gauge
15 Target pressure input
16 Switching device
17 Adjustment device
18 Displacement gauge
18a Displacement sensor
19 Wear adjustment device
20 Target position input
3 Actuating cylinder
31 Housing
32 Piston
32a First cylinder surface
32b Second cylinder surface
33 Piston rod
34 First hydraulic chamber
35 Second hydraulic chamber

The invention claimed is:

1. A hydraulic control loop (1) for controlling a hydraulic actuating cylinder (3),
the hydraulic actuating cylinder (3) having a cylindrical housing (31) and a piston (32) displaceably arranged therein,
the piston (32) dividing the cylindrical housing interior into a first hydraulic chamber (34) and a second hydraulic chamber (35),
wherein the hydraulic control loop (1) comprises:
a first hydraulic valve (10), which is configured to supply the first hydraulic chamber (34) with a hydraulic fluid, wherein a hydraulic pressure of the first hydraulic chamber (34) is adjustable via a control of the first hydraulic valve (10);
a second hydraulic valve (11), which is configured to supply the second hydraulic chamber (35) with a hydraulic fluid, wherein a hydraulic pressure of the second hydraulic chamber (35) is adjustable via a control of the second hydraulic valve (11); and
a control device (12-20) that is provided for controlling the first hydraulic valve (10) and the second hydraulic valve (11) and is configured
to control, in a position control state, the second hydraulic valve (11) with a position control signal dependent on a working position of the piston (32) and
to control the first hydraulic valve (10) with an adjusted position control signal, which is a signal generated based on the position control signal,
wherein the control device (12-20) includes a switching device (16), which is configured to switch between the position control state and a pressure control state,
wherein, in the pressure control state for positioning the piston (32), the first hydraulic valve (10) is controlled by the control device (12-20), such that the hydraulic pressure in the first hydraulic chamber (34) remains essentially constant, while the second hydraulic valve (11), controlled by the position control signal, functions as an actuator.

2. The hydraulic control loop (1) according to claim 1, wherein the hydraulic actuating cylinder (3) is an adjusting cylinder for a working roll in a roll stand.

3. The hydraulic control loop (1) according to claim 1, wherein the control device (12-20) is configured to carry out the control of the first hydraulic valve (10) and the second hydraulic valve (11) in an event of a sudden change in load on the piston (32) in the position control state.

4. The hydraulic control loop (1) according to claim 1, wherein the control device (12-20) comprises a position controller (12), which is configured to generate the position control signal, along with an adjustment device (17) having an input that receives the position control signal and an output that outputs the adjusted position control signal,
wherein the adjustment device (17) is configured to generate the adjusted position control signal by inversion of the position control signal.

5. The hydraulic control loop (1) according to claim 1, wherein the control device (12-20) has a wear adjustment device (19), which is configured to evaluate the position control signal with an additional factor that is provided for compensating wear of the first hydraulic valve (10) and/or the second hydraulic valve (11).

6. The hydraulic control loop (1) according to claim 1, wherein the piston (32) has a first cylinder surface (32a) and a second cylinder surface (32b) and a nominal flow rate of the first hydraulic valve (10) is lower than a nominal flow rate of the second hydraulic valve (11) by a surface ratio of the first cylinder surface (32a) to the second cylinder surface (32b),
wherein the first cylinder surface (32a) is arranged on a rod side of the piston (32), while there is no piston rod on the opposite side of the piston (32).

7. The hydraulic control loop (1) according to claim 1, wherein the first hydraulic valve (10) and/or the second hydraulic valve (11) is a continuously variable valve.

8. A method for controlling a hydraulic actuating cylinder (3) which comprises a cylindrical housing (31) and a piston (32) displaceably arranged therein, the piston dividing the cylindrical housing interior into a first hydraulic chamber (34) and a second hydraulic chamber (35), the method comprising:
supplying hydraulic pressure to the first hydraulic chamber (34) by a first hydraulic valve (10); and supplying hydraulic pressure to the second hydraulic chamber (35) by a second hydraulic valve (11), wherein, in a position control state, the second hydraulic chamber (35) is supplied with hydraulic pressure dependent on a working position of the piston (32), by controlling the second hydraulic valve (11) with a position control signal, and the first hydraulic chamber (34) is supplied with hydraulic pressure dependent on the working position of the piston (32), by controlling the first hydraulic valve (10) with an adjusted position control signal, which is a signal generated based on the position control signal;

positioning the piston (32) in a pressure control state in which the first hydraulic valve (10) is controlled such that the hydraulic pressure in the first hydraulic chamber (34) remains essentially constant, and the second hydraulic valve (11) is controlled by the position control signal; and switching from the pressure control state to the position control state.

9. The method according to claim 8, wherein the first hydraulic valve (10) and the second hydraulic valve (11) are controlled in the position control state in an event of a sudden change in load on the piston (32).

10. The method according to claim 8, wherein the adjusted position control signal is generated by inverting the position control signal.

11. The method according to claim 8, wherein the position control signal is evaluated with an additional factor, which is provided to compensate for wear of the first hydraulic valve (10) and/or the second hydraulic valve (11).

12. The method according to claim 11, wherein an output of a leakage fluid integrator is used as a measure of wear.

13. The method according to claim 12, wherein the hydraulic pressure in the first hydraulic chamber (34) and/or the second hydraulic chamber (35) in the pressure control state is adjusted essentially to a system pressure before switching to the position control state.

14. The method according to claim 8, wherein, in the position control state, the hydraulic pressure in the first hydraulic chamber (34) and/or the second hydraulic chamber (35), which is dependent on the position of the piston (32), is set in such a manner that it decreases from a stop position of the piston on a piston side that is relieved when a change in load occurs on the piston (32) to the opposite stop position over a travel distance.

* * * * *